(12) United States Patent
Seo et al.

(10) Patent No.: US 9,455,090 B2
(45) Date of Patent: Sep. 27, 2016

(54) CAPACITOR AND METHOD OF FABRICATING THE SAME

(71) Applicant: LG INNOTEK CO., LTD., Seoul (KR)

(72) Inventors: Sang Won Seo, Seoul (KR); Seung Hwa Kwon, Seoul (KR); Chil Young Ji, Seoul (KR); Yong Jun Ko, Seoul (KR); Hyun Kyu Park, Seoul (KR); Jeong Gi Seo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 130 days.

(21) Appl. No.: 14/360,899

(22) PCT Filed: Oct. 10, 2012

(86) PCT No.: PCT/KR2012/008203
§ 371 (c)(1),
(2) Date: May 27, 2014

(87) PCT Pub. No.: WO2013/077544
PCT Pub. Date: May 30, 2013

(65) Prior Publication Data
US 2015/0022939 A1    Jan. 22, 2015

(30) Foreign Application Priority Data
Nov. 24, 2011 (KR) .................. 10-2011-0123882

(51) Int. Cl.
*H01G 5/16* (2006.01)
*H01G 5/011* (2006.01)
*H01G 5/013* (2006.01)

(52) U.S. Cl.
CPC .............. *H01G 5/16* (2013.01); *H01G 5/011* (2013.01); *H01G 5/0134* (2013.01)

(58) Field of Classification Search
CPC .......... H01G 5/16; H01G 5/011; H01G 5/04; H01G 5/0134
See application file for complete search history.

(56) References Cited

U.S. PATENT DOCUMENTS

| | | | |
|---|---|---|---|
| 5,959,516 A * | 9/1999 | Chang ...................... | H03J 3/20 333/197 |
| 5,992,233 A * | 11/1999 | Clark ................. | G01C 19/5719 361/280 |
| 7,085,122 B2 * | 8/2006 | Wu ......................... | H01G 5/06 333/134 |
| 2004/0075158 A1 | 4/2004 | Nakayama | |
| 2006/0067840 A1 * | 3/2006 | Kawakubo ............... | H01G 5/16 417/413.2 |
| 2008/0265710 A1 * | 10/2008 | Ikehashi ................ | H02N 1/006 310/309 |

(Continued)

FOREIGN PATENT DOCUMENTS

| | | | |
|---|---|---|---|
| JP | 2003-124063 A | 4/2003 | |
| JP | 2004-172504 A | 6/2004 | |

(Continued)

OTHER PUBLICATIONS

International Search Report in International Application No. PCT/KR2012/008203, filed Oct. 10, 2012.

*Primary Examiner* — David M Sinclair
(74) *Attorney, Agent, or Firm* — Saliwanchik, Lloyd & Eisenschenk

(57) ABSTRACT

Disclosed are a capacitor and a method of fabricating the same. The capacitor includes a first electrode; a second electrode spaced apart from the first electrode while facing the first electrode; a driving member connected to the second electrode to move the second electrode relative to the first electrode; and an insulating connection member between the driving member and the second electrode.

19 Claims, 6 Drawing Sheets

(56) References Cited

U.S. PATENT DOCUMENTS

| | | | | |
|---|---|---|---|---|
| 2010/0038753 A1* | 2/2010 | Ni | ............................ | H01G 5/18 257/532 |
| 2010/0328840 A1* | 12/2010 | Yamazaki | ................. | H01G 5/16 361/281 |
| 2014/0240894 A1* | 8/2014 | Elshurafa | ................ | H01L 28/86 361/281 |

FOREIGN PATENT DOCUMENTS

| | | |
|---|---|---|
| JP | 2011-108989 A | 6/2011 |
| KR | 10-2011-0130999 A | 12/2011 |

* cited by examiner

CAPACITOR AND METHOD OF FABRICATING THE SAME

CROSS-REFERENCE TO RELATED APPLICATIONS

This application is the U.S. national stage application of International Patent Application No. PCT/KR2012/008203, filed Oct. 10, 2012, which claims priority to Korean Application No. 10-2011-0123882, filed Nov. 24, 2011, the disclosures of each of which are incorporated herein by reference in their entirety.

TECHNICAL FIELD

The embodiment relates to a capacitor and a method of fabricating the same.

BACKGROUND ART

Various frequencies are required to operate communication equipment. To this end, the communication equipment needs to have a frequency generating/processing (amplifying) device for generating various frequencies. Such a frequency generating/processing (amplifying) device can be realized by using a crystal or an LC resonance circuit.

Since the frequency generated from the LC resonance circuit may vary depending on L (inductance) and C (capacitance), the LC resonance circuit can generate various frequencies by varying the L or the C. In most cases, the LC resonance circuit generates various frequencies by varying the C.

In this regard, various studies and research have been performed to continuously vary the capacitance by using the micro electro mechanical system (hereinafter, referred to as MEMS). In particular, studies are being carried out to vary the capacitance and the inductance by using the continuous mechanical displacement of the driving unit of the MEMS.

DISCLOSURE OF INVENTION

Technical Problem

The embodiment provides a capacitor capable of readily adjusting capacitance.

Solution to Problem

A capacitor according to the embodiment includes a first electrode; a second electrode spaced apart from the first electrode while facing the first electrode; a driving member connected to the second electrode to move the second electrode relative to the first electrode; and an insulating connection member between the driving member and the second electrode.

A capacitor according to the embodiment includes a substrate; a first electrode on the substrate; a second electrode overlapping with the first electrode on the substrate; and a driving member fixed to the substrate to control a distance between the first and second electrodes and an overlap area between the first and second electrodes, wherein the first electrode includes a first electrode facing a part of the second electrode; and a third electrode spaced apart from the first electrode while facing another part of the second electrode.

A method of fabricating a capacitor according to the embodiment includes the steps of forming a first electrode on a substrate; forming a sacrificial spacer layer on the first electrode; forming an insulating connection member on the sacrificial spacer layer; forming a second electrode connected to the insulating connection member on the sacrificial spacer layer; forming a driving member connected to the insulating connection member; and removing the sacrificial spacer layer.

A capacitor according to the embodiment includes a first electrode; a second electrode spaced apart from the first electrode while facing the first electrode; and a driving member connected to the second electrode to move the second electrode relative to the first electrode, wherein the second electrode includes a support electrode facing the first electrode; and a protruding electrode protruding from the support electrode toward the first electrode.

A capacitor according to the embodiment includes a first electrode; a second electrode spaced apart from the first electrode while facing the first electrode; a first driving member connected to the second electrode to move the second electrode relative to the first electrode; and a third driving member facing the second electrode to move the second electrode relative to the first electrode.

Advantageous Effects of Invention

The capacitor according to the embodiment can move the second electrode relative to the first electrode by using the driving member. Thus, the driving member can finely adjust the distance between the first and second electrodes. In addition, the driving member can finely control the overlap area between the first and second electrodes.

Therefore, the capacitor according to the embodiment can continuously adjust capacitance between the first and second electrodes by mechanically driving the second electrode.

In addition, the capacitor according to the embodiment may include the ninth driving electrode. Since the support electrode faces the ninth driving electrode, the ninth driving electrode can effectively drive the second electrode.

Thus, the second electrode can be located closer to the first electrode at the regular interval. In particular, the second electrode layer can make contact with an entire area of a dielectric layer formed on the first electrode.

The capacitor according to the embodiment can effectively, mechanically and finely drive the second electrode. That is, the capacitor according to the embodiment can precisely and mechanically control the second electrode in the first and second directions so that desired capacitance can be generated between the first and second electrodes.

MODE FOR THE INVENTION

Figure 1:
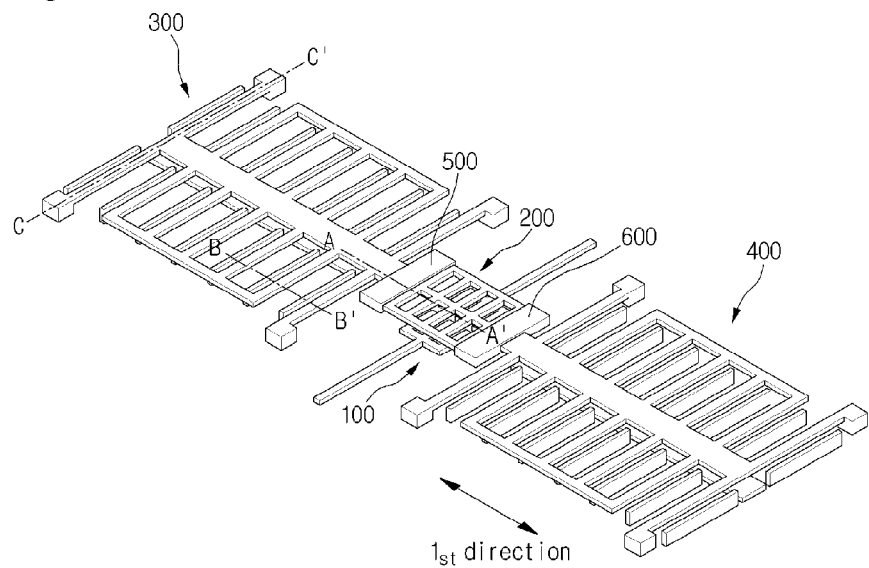
FIG. 1 is a perspective view showing a variable capacitor according to the embodiment.

In the description of the embodiments, it will be understood that when a panel, a sheet, a member, a guide or a unit is referred to as being "on" or "under" another panel, another sheet, another member, another guide, or another unit, it can be "directly" or "indirectly" on the other panel, sheet, member, guide or unit. Such a position of the elements has been described with reference to the drawings. The size of elements shown in the drawings may be exaggerated for the purpose of convenience or clarity. In addition, the size of elements does not utterly reflect an actual size.

Figure 2:
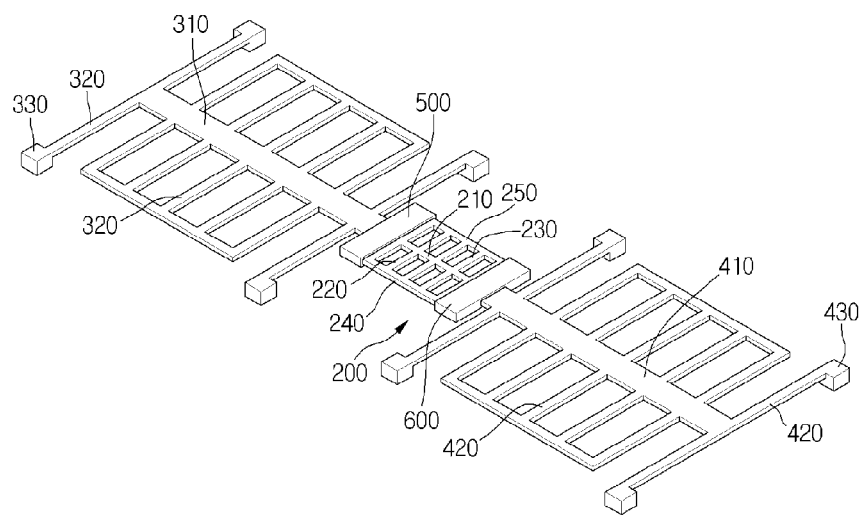
FIG. 2 is a perspective view showing a second driving electrode, a fourth driving electrode, a second electrode, a first insulating connection member and a second insulating connection member.
Figure 3:
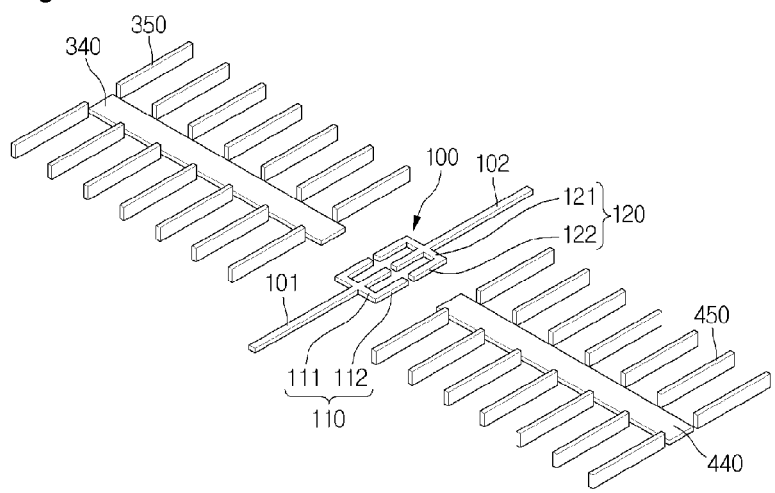
FIG. 3 is a perspective view showing a first driving electrode, a third driving electrode, and a first electrode.
Figure 4:
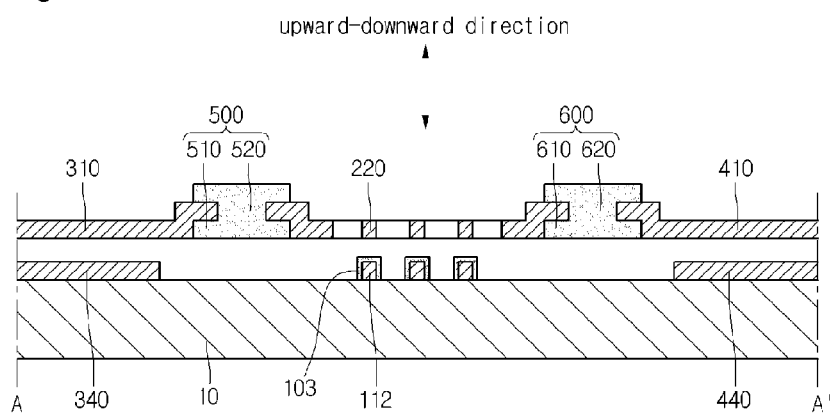
FIG. 4 is a sectional view taken along line A-A' of FIG. 1.
Figure 5:
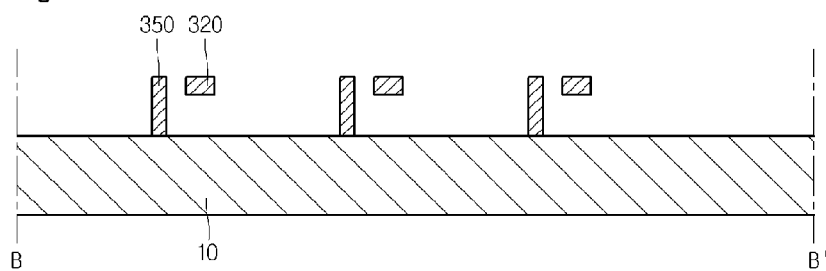
FIG. 5 is a sectional view taken along line B-B' of FIG. 1.
Figure 6:
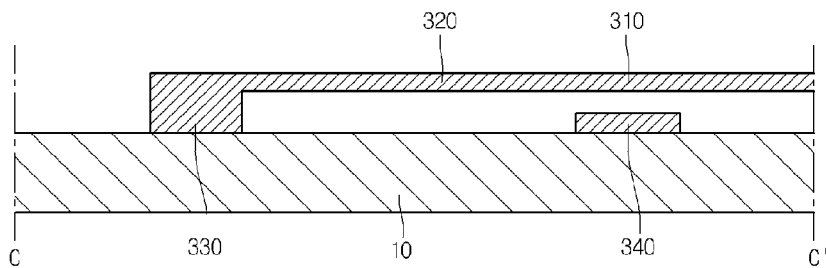
FIG. 6 is a sectional view taken along line C-C' of FIG. 1.

FIG. 1 is a perspective view showing a variable capacitor according to the embodiment, FIG. 2 is a perspective view showing a second driving electrode, a fourth driving electrode, a second electrode, a first insulating connection member and a second insulating connection member, FIG. 3 is a perspective view showing a first driving electrode, a third driving electrode, and a first electrode, FIG. 4 is a sectional view taken along line A-A' of FIG. 1, FIG. 5 is a sectional view taken along line B-B' of FIG. 1 and FIG. 6 is a sectional view taken along line C-C' of FIG. 1.

Referring to FIGS. 1 to 6, the variable capacitor according to the first embodiment includes a substrate 10, a first electrode 100, a second electrode 200, a first driving member 300, a second driving member 400, a first insulating connection member 500 and a second insulating connection member 600.

The substrate 10 supports the first electrode 100, the second electrode 200, the first driving member 300, the second driving member 400, the first insulating connection member 500 and the second insulating connection member 600. In addition, the substrate 10 may fix the first driving member 300 and the second driving member 400.

The substrate 10 is an insulator. The substrate 10 may be rigid or flexible. The substrate 10 may be formed by using silicon or glass.

The first electrode 100 is disposed on the substrate 10. The first electrode 100 is fixed to the substrate 10. The first electrode 100 may be spaced apart from the first driving member 300, the second driving member 400 and the second electrode 200.

The first electrode 100 may have a thickness in a range of about 2.5 μm to about 3.5 μm.

An input wire 101 for inputting a signal and an output wire 102 for outputting the signal may be connected to the first electrode 100.

As shown in FIGS. 1, 3 and 4, the first electrode 100 includes a first electrode 110 and a third electrode 120. The first electrode 110 is spaced apart from the third electrode 120. The first electrode 110 is connected to the input wire 101 and the third electrode 120 is connected to the output wire 102.

The first electrode 110 includes a first connection electrode 111 and a plurality of first branch electrodes 112. The first branch electrodes 112 extend from the first connection electrode 111. In detail, the first branch electrodes 112 extend in the direction different from the extension direction of the first connection electrode 111. The first branch electrodes 112 may perpendicularly cross the first connection electrode 111. The first connection electrode 111 may be integrally formed with the first branch electrodes 112.

The first branch electrodes 112 may have the thickness in the range of about 2.5 μm to about 3.5 μm and the width in the range of about 1.5 μm to about 2.5 μm.

In addition, the first connection electrode 111 is connected to the input wire 101. The first connection electrode 111 may be integrally formed with the input wire 101. The first connection electrode 111 may extend in the first direction.

The third electrode 120 includes a third connection electrode 121 and a plurality of third branch electrodes 122. The third branch electrodes 122 extend from the third connection electrode 121. In detail, the third branch electrodes 122 extend in the direction different from the extension direction of the third connection electrode 121. The third branch electrodes 122 may perpendicularly cross the third connection electrode 121. The third connection electrode 121 may be integrally formed with the third branch electrodes 122.

In addition, the third connection electrode 121 is connected to the output wire 102. The third connection electrode 121 may be integrally formed with the output wire 102. The third connection electrode 121 may extend in the first direction. That is, the third connection electrode 121 may extend in the extension direction of the first connection electrode 111.

The third branch electrodes 122 may extend from end portions of the first branch electrodes 112. That is, the third branch electrodes 122 are spaced apart from the first branch electrodes 112 and disposed corresponding to the first branch electrodes 112, respectively. That is, end portions of the first branch electrodes 112 may correspond to end portions of the third branch electrodes 122, respectively.

The third branch electrodes 122 may have the thickness in the range of about 2.5 μm to about 3.5 μm and the width in the range of about 1.5 μm to about 2.5 μm.

The second electrode 200 is disposed on the substrate 10. In detail, the second electrode 200 is disposed on the first electrode 100. The second electrode 200 is spaced apart from the first electrode 100. For instance, if the first and second driving members 300 and 400 are not driven, a distance between the first and second electrodes 100 and 200 is in the range of about 3 μm to about 7 μm. In addition, the second electrode 200 faces the first electrode 100. Further, when viewed from the top of the substrate 10, the second electrode 200 may partially or fully overlap with the first electrode 100. The second electrode 200 may float over the first electrode 100.

The second electrode 200 is driven by the first and second driving members 300 and 400. In detail, the second electrode 200 is moved relative to the first electrode 100 by the first and second driving members 300 and 400. In more detail, the first electrode 100 is fixed to the substrate 10 and the second electrode 200 moves in the first direction. In addition, the second electrode 200 may move up and down. Thus, the distance between the first and second electrodes 100 and 200 can be adjusted by the first and second driving members 300 and 400.

The second electrode 200 is connected to the first and second insulating connection members 500 and 600. In addition, the second electrode 200 is connected to the first driving member 300 through the first insulating connection member 500. Further, a part of the second electrode 200 is inserted into the first insulating connection member 500.

In addition, the second electrode 200 is connected to the second driving member 400 through the second insulating connection member 600. Further, a part of the second electrode 200 is inserted into the second insulating connection member 600.

The second electrode 200 is disposed between the first and second insulating connection members 500 and 600. In addition, the second electrode 200 is disposed between the first and second driving members 300 and 400.

The second electrode 200 may have the thickness in the range of about 3 μm to about 5 μm.

As shown in FIGS. 1, 2 and 4, the second electrode 200 includes a main electrode 210, a plurality of first sub-electrodes 220, a plurality of second sub-electrodes 230, a second connection electrode 240 and a fourth connection electrode 250.

The main electrode 210 extends in the first direction. The main electrode 210 extends from the first insulating connection member 500 to the second insulating connection member 600. The main electrode 210 is disposed corresponding to the region between the first branch electrodes 112 and second branch electrodes.

The first sub-electrodes 220 extend from the main electrode 210. In detail, the first sub-electrodes 220 extend in the direction crossing the first direction. In more detail, the first sub-electrodes 220 extend in the direction perpendicular to the first direction. The first sub-electrodes 220 may extend in parallel to each other.

The first sub-electrodes 220 may correspond to the first branch electrodes 112, respectively. That is, each of the first sub-electrodes 220 may correspond to each of the first branch electrodes 112. In detail, each of the first sub-electrodes 220 is spaced apart from each of the first branch electrodes 112 while extending in the extension direction the first branch electrodes 112. In addition, the first sub-electrodes 220 may have the width corresponding to the width of the first branch electrodes 112. That is, the width of the first sub-electrodes 220 may be substantially equal to the width of the first branch electrodes 112.

The second sub-electrodes 230 extend from the main electrode 210. In detail, the second sub-electrodes 230 extend in the direction crossing the first direction. In more detail, the second sub-electrodes 230 extend in the direction perpendicular to the second direction. The second sub-electrodes 230 may extend in parallel to each other.

The second sub-electrodes 230 may correspond to the third branch electrodes 122, respectively. That is, each of the second sub-electrodes 230 may correspond to each of the third branch electrodes 122. In detail, each of the second sub-electrodes 230 is spaced apart from each of the third branch electrodes 122 while extending in the extension direction the third branch electrodes 122. In addition, the second sub-electrodes 230 may have the width corresponding to the width of the third branch electrodes 122. That is, the width of the second sub-electrodes 230 may be substantially equal to the width of the third branch electrodes 122.

The second connection electrode 240 is connected to the first sub-electrodes 220. In detail, the second connection electrode 240 is connected to end portions of the first sub-electrodes 220. The second connection electrode 240 may extend in the first direction.

The second connection electrode 240 can reinforce the electrical and mechanical characteristics of the first sub-electrodes 220. That is, the second connection electrode 240 is electrically and mechanically connected to the first sub-electrodes 220 to reduce the resistance of the second electrode 200 while improving the mechanical strength of the second electrode 200.

The fourth connection electrode 250 is connected to the second sub-electrodes 230. In detail, the fourth connection electrode 250 is connected to end portions of the second sub-electrodes 230. The fourth connection electrode 250 may extend in the first direction.

The fourth connection electrode 250 can reinforce the electrical and mechanical characteristics of the second sub-electrodes 230. That is, the fourth connection electrode 250 is electrically and mechanically connected to the second sub-electrodes 230 to reduce the resistance of the second electrode 200 while improving the mechanical strength of the second electrode 200. The fourth connection electrode 250 can be connected to the main electrode 210.

The main electrode 210, the first sub-electrodes 220, the second sub-electrodes 230, the second connection electrode 240 and the fourth connection electrode 250 can be integrally formed with each other.

A dielectric layer 103 can be disposed between the first and second electrodes 100 and 200. The dielectric layer 103 can be disposed on the top surface of the first electrode 100. That is, the dielectric layer 103 can be disposed on the top surfaces of the first electrode 110 and the third electrode 120. In detail, the dielectric layer 103 can also be disposed at the lateral sides of the first electrode 110 and the third electrode 120. That is, the dielectric layer 103 is spaced apart from the second electrode 200 while directly making contact with the first electrode 100.

In addition, the dielectric layer 103 can be disposed on the bottom surface of the second electrode 200. The dielectric layer 103 can directly make contact with the bottom surface of the second electrode 200. That is, the dielectric layer 103 is spaced apart from the first electrode 100 while directly making contact with the second electrode 200.

The dielectric layer 103 may have a high dielectric constant. The dielectric layer 103 may be formed by using a ferroelectric material, such as iridium oxide, titanium oxide or ruthenium oxide.

The first driving member 300 is disposed on the substrate 10. The first driving member 300 is fixed to the substrate 10. The first driving member 300 is connected to the second electrode 200. In detail, the first driving member 300 is connected to the second electrode 200 through the first insulating connection member 500. Thus, the first driving member 300 is physically connected to the second electrode 200 while being insulated from the second electrode 200.

The first driving member 300 drives the second electrode 200. In detail, the first driving member 300 moves the second electrode 200. In more detail, the first driving member 300 moves the second electrode 200 relative to the first electrode 100. That is, the first driving member 300 can move the second electrode 200 in the direction horizontal to the substrate 10. In detail, the first driving member 300 can move the second electrode 200 in the first direction. In addition, the first driving member 300 can move the second electrode 200 in the direction crossing the first direction. For instance, the first driving member 300 can move the second electrode 200 up and down.

As shown in FIGS. 1 to 6, the first driving member 300 includes a first driving electrode 310, a plurality of second driving electrodes 320, a first fixing part 330, a third driving electrode 340 and a plurality of fourth driving electrodes 350.

As shown in FIGS. 1, 2 and 4, the first driving electrode 310 is disposed on the substrate 10. The first driving electrode 310 may be spaced apart from the substrate 10. In addition, the first driving electrode 310 faces the second driving electrodes 320. The first driving electrode 310 is spaced apart from the second driving electrodes 320. For instance, if the first and second driving members 300 and 400 are not driven, a distance between the first and second driving electrodes 310 and 320 is in the range of about 3 μm to about 7 μm.

The first driving electrode 310 may extend in the first direction. The first driving electrode 310 may be connected to the first insulating connection member 500. A part of the first driving electrode 310 may be inserted into the first insulating connection member 500.

Referring to FIGS. 1, 2 and 5, the second driving electrodes 320 extend from the first driving electrode 310. The second driving electrodes 320 may extend in parallel to each other. In detail, the second driving electrodes 320 may extend in the direction crossing the extension direction of the first driving electrode 310. In more detail, the second driving electrodes 320 may extend in the direction perpendicular to the first direction.

The second driving electrodes 320 are spaced part from the substrate 10. That is, the second driving electrodes 320 may float over the substrate 10. In addition, the second driving electrodes 320 are spaced apart from each other.

Referring to FIGS. 1, 2 and 6, the first fixing part 330 is fixed to the substrate 10. The first fixing part 330 is connected to at least one of the second driving electrodes 320. In detail, four first fixing parts 330 are provided and the four first fixing parts 330 are connected to four second driving electrodes 320, respectively. The first fixing part 330 fixes the driving electrode 310 and the second driving electrodes 320 to the substrate 10.

The first driving electrode 310, the second driving electrodes 320 and the first fixing part 330 can be integrally formed with each other.

The first driving electrode 310 and the second driving electrodes 320 may have the thickness in a range of about 7 μm to about 13 μm.

Referring to FIGS. 1, 3 and 4, the third driving electrode 340 is disposed on the substrate 10. The third driving electrode 340 may be disposed on the top surface of the substrate 10. The third driving electrode 340 may be fixed to the substrate 10. The third driving electrode 340 corresponds to the first driving electrode 310. In detail, the third driving electrode 340 faces the first driving electrode 310. In more detail, the third driving electrode 340 faces the first driving electrode 310. The third driving electrode 340 may be substantially parallel to the first driving electrode 310.

In addition, the third driving electrode 340 may extend in the extension direction of the first driving electrode 310. The third driving electrode 340 may extend in the first direction.

The third driving electrode 340 may have the thickness in a range of about 2.5 μm to about 3.5 μm.

Referring to FIGS. 1, 3 and 5, the fourth driving electrodes 350 are disposed on the substrate 10. The fourth driving electrodes 350 are fixed to the substrate 10. The fourth driving electrodes 350 are spaced apart from the third driving electrode 340. The fourth driving electrodes 350 may be formed separately from the third driving electrode 340.

The fourth driving electrodes 350 correspond to the second driving electrodes 320, respectively. In detail, the fourth driving electrodes 350 face the second driving electrodes 320. In more detail, the fourth driving electrodes 350 are adjacent to the second driving electrodes 320 while being spaced apart from the second driving electrodes 320, respectively. For instance, when the first and second driving members 300 and 400 are not driven, a distance between the second and fourth driving electrodes 320 and 350, which are adjacent to each other, may be in the range of about 2.5 μm to about 3.5 μm. The fourth driving electrodes 350 may be substantially parallel to the second driving electrodes 320.

The fourth driving electrodes 350 may have the thickness in the range of about 15 μm to about 25 μm and the width in the range of about 3 μm to about 10 μm.

The fourth driving electrodes 350 may be electrically connected with each other. In addition, the fourth driving electrodes 350 may be individually driven.

The first electrode 100, the second electrode 200, the first driving member 300 and the second driving member 400 may include a metal or an alloy having the high electric conductivity. For instance, the first electrode 100, the second electrode 200, the first driving member 300 and the second driving member 400 may be formed by using Ni, Cu, Au, Co, W, Pt, Al or an alloy thereof.

The first driving member 300 can move the second electrode 200 through the electrostatic attractive force and/or repulsive force. In addition, the first driving member 300 may serve as an elastic member, such as a spring. In detail, the second driving electrodes 320 serve as the elastic members having the elasticity.

The electrostatic attractive force and/or repulsive force may be generated between the first and third driving electrodes 310 and 340. That is, if a predetermined voltage is applied to the first driving electrode 310, positive charges or negative charges are collected in the first driving electrode 310. At this time, since the first driving electrode 310 faces the third driving electrode 340, charges collected in the third driving electrode 340 may be different from charges collected in the first driving electrode 310 due to the electrostatic induction. Thus, the attractive force may be generated between the first and third driving electrodes 310 and 340. In addition, the attractive force may be generated between the first and third driving electrodes 310 and 340 when a predetermined voltage is applied to the third driving electrode 340. Further, the attractive force may be generated between the first and third driving electrodes 310 and 340 when different voltages are applied to the first and third driving electrodes 310 and 340, respectively.

In this manner, if the attractive force is generated between the first and third driving electrodes 310 and 340, the second electrode 200 may come closer to the first electrode 100. That is, since the third driving electrode 340 is fixed to the substrate 10, the second electrode 200 may move downward with respect to the first electrode 100. Thus, the second electrode 200 can directly make contact with the dielectric layer 103. Therefore, the capacitance may be generated by the first and second electrodes 100 and 200 and the dielectric layer 103. That is, as the first and second electrodes 100 and 200 come closer to each other, the capacitance generated between the first and second electrodes 100 and 200 may be increased.

In addition, if the voltage is not applied to the first and third driving electrodes 310 and 340, the second electrode 200 may move away from the first electrode 100 due to the elasticity of the second driving electrodes 320. Thus, the capacitance generated between the first and second electrodes 100 and 200 may be reduced.

Further, in the same manner, the electrostatic attractive force and/or repulsive force may be generated between the second driving electrodes 320 and the fourth driving electrodes 350. As described above, the distance between the second driving electrodes 320 and the fourth driving electrodes 350 may be increased or reduced.

At this time, the fourth driving electrodes 350 are directly fixed to the substrate 10, the second driving electrodes 320 are spaced apart from the substrate 10, and the second driving electrodes 320 are indirectly fixed to the substrate 10 through the first fixing part 330.

Accordingly, the second driving electrodes 320 and the first driving electrode 310 can move in the horizontal direction due to the electrostatic attractive force and/or repulsive force. In detail, due to the second and fourth driving electrodes 320 and 350, the first driving electrode 310 may move in the first direction relative to the substrate 10. That is, the first driving member 300 can move the second electrode 200 in the horizontal direction relative to the substrate 10.

Therefore, the second electrode 200 is moved in the horizontal direction relative to the first electrode 100 by the first driving member 300. In addition, the first and second electrodes 100 and 200 may be offset from each other by the first driving member 300. That is, the overlap area between the first and second electrodes 100 and 200 may be adjusted. In detail, the overlap area between the first branch electrodes 112 and the first sub-electrodes 220 may be controlled by the first driving member 300. In addition, the overlap area between the third branch electrodes 122 and the first sub-electrodes 220 may be controlled by the first driving member 300. Therefore, the capacitance between the first and second electrodes 100 and 200 may be controlled.

The second driving member 400 is disposed on the substrate 10. The second driving member 400 is opposite to the first driving member 300 about the second electrode 200. That is, the second electrode 200 is disposed between the first driving member 300 and the second driving member 400.

The second driving member 400 is fixed to the substrate 10. The second driving member 400 is connected to the second electrode 200. In detail, the second driving member 400 is connected to the second electrode 200 through the second insulating connection member 600. Thus, the second driving member 400 is physically connected to the second electrode 200 while being insulated from the second electrode 200.

The second driving member 400 drives the second electrode 200. In detail, the second driving member 400 moves the second electrode 200. In more detail, the second driving member 400 moves the second electrode 200 relative to the first electrode 100. That is, the second driving member 400 can move the second electrode 200 in the direction horizontal to the substrate 10. In detail, the second driving member 400 can move the second electrode 200 in the first direction. In addition, the second driving member 400 can move the second electrode 200 in the direction crossing the first direction. For instance, the second driving member 400 can move the second electrode 200 up and down.

The second driving member 400 is symmetrical to the first driving member 300 about the second electrode 200. In addition, the second driving member 400 has the structure substantially the same as that of the first driving member 300. Thus, the second driving member 400 has the function substantially the same as that of the first driving member 300. That is, the second driving member 400 includes a fifth driving electrode 410, six driving electrodes 420, a second fixing part 430, a seventh driving electrode 440 and eighth driving electrodes 450, which have the structure and function the same as those of the first driving electrode 310, the second driving electrodes 320, the first fixing part 330, the third driving electrode 340 and the fourth driving electrodes 350, respectively.

The first insulating connection member 500 is disposed between the first driving member 300 and the second electrode 200. In addition, the first insulating connection member 500 is connected to the first driving member 300 and the second electrode 200. That is, the first insulating connection member 500 physically connects the second electrode 200 to the first driving member 300.

The first insulating connection member 500 includes an insulator. The first insulating connection member 500 may include oxide, such as silicon oxide, nitride, such as silicon nitride, or polymer, such as polyimide. Thus, the first insulating connection member 500 insulates the first driving member 300 from the second electrode 200. That is, the first insulating connection member 500 electrically insulates the first driving member 300 from the second electrode 200 while mechanically connecting the first driving member 300 to the second electrode 200.

The first insulating connection member 500 may directly make contact with the lateral side of the second electrode 200. In addition, the first insulating connection member 500 may directly make contact with parts of top and bottom surfaces of the second electrode 200.

The first insulating connection member 500 includes a first insulating part 510 and a second insulating part 520. The first insulating part 510 is disposed under a part of the second electrode 200. The second insulating part 520 is disposed between the second electrode 200 and the first driving member 300 and on the second electrode 200 and the first driving member 300.

The second insulating connection member 600 is disposed between the second driving member 400 and the second electrode 200. In addition, the second insulating connection member 600 is connected to the second driving member 400 and the second electrode 200. That is, the second insulating connection member 600 physically connects the second electrode 200 to the second driving member 400.

The second insulating connection member 600 includes an insulator. The second insulating connection member 600 may include oxide, such as silicon oxide, nitride, such as silicon nitride, or polymer, such as polyimide. Thus, the second insulating connection member 600 insulates the second driving member 400 from the second electrode 200. That is, the second insulating connection member 600 electrically insulates the second driving member 400 from the second electrode 200 while mechanically connecting the second driving member 400 to the second electrode 200.

The second insulating connection member 600 may directly make contact with the lateral side of the second electrode 200. In addition, the second insulating connection member 600 may directly make contact with parts of top and bottom surfaces of the second electrode 200.

The second insulating connection member 600 includes a third insulating part 610 and a fourth insulating part 620. The third insulating part 610 is disposed under a part of the second electrode 200. The fourth insulating part 620 is disposed between the second electrode 200 and the second driving member 400 and on the second electrode 200 and the second driving member 400.

The second electrode 200 is connected to the first and second driving members 300 and 400 through the first and second insulating connection members 500 and 600, respectively. Thus, the first and second insulating connection members 500 and 600 can prevent noise, which is generated from the first driving member 300 or the second driving member 400, from being transferred to the second electrode 200.

The second electrode 200 moves down and overlaps with the first electrode 100 as required by the first and second driving members 300 and 400. Thus, the first capacitance C1 is generated between the first electrode 110 and the second electrode 200 and the second capacitance C2 is generated between the third electrode 120 and the second electrode 200 as required.

Therefore, the total capacitance C between the first and second electrodes 100 and 200 may be determined as follows.

$$1/C=1/C1+1/C2$$

In this manner, the desired capacitance can be generated between the input wire 101 and the output wire 102 by the first and second driving members 300 and 400. At this time, the variable capacitor according to the embodiment can filter the RF (radio frequency) signal input thereto through the input wire 101.

The second driving member 400 is connected to the first driving member 300 and the second electrode 200 through the first and second insulating connection members 500 and 600, respectively. Thus, the distortion of the RF signal input through the input wire 101 may be diminished.

FIGS. 7 to 21 are sectional views showing the procedure for fabricating the variable capacitor according to the first embodiment. In the description about the present embodiment, the previous description about the variable capacitor will be incorporated by reference. That is, the previous description of the variable capacitor may be basically incorporated herein by reference.

Figure 7:
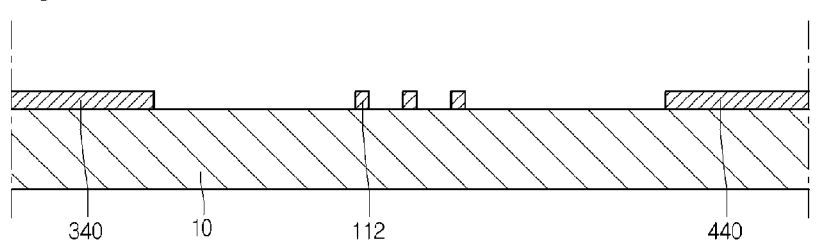
FIGS. 7 to 21 are sectional views showing the procedure for fabricating a variable capacitor according to the first embodiment.
Figure 8:
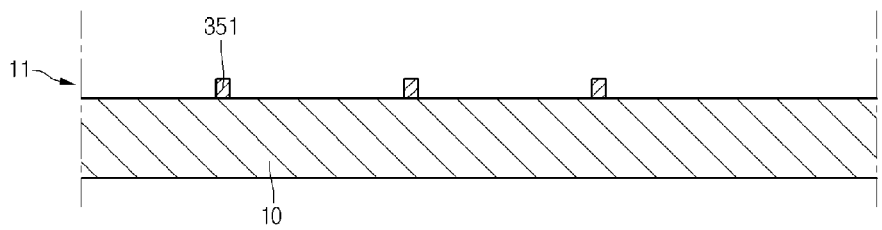
Figure 9:
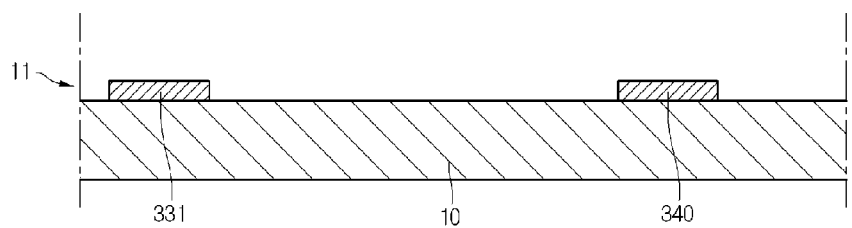

Referring to FIGS. 7 to 9, a first electrode layer 11 is formed on the substrate 10. The first electrode layer 11 can be formed by depositing a metal or an alloy having high electric conductivity. For instance, the first electrode layer 11 can be formed through the plating process. That is, after forming a seed layer including gold (Au) on the substrate 10, a metal is plated on the seed layer and then the first electrode layer 11 is formed through the patterning process.

The first electrode layer 11 includes the first electrode 100, the input wire 101, the output wire 102, the third driving electrode 340, the seventh driving electrode, a lower portion 331 of the first fixing part 330, a lower portion of the second fixing part 430, lower portions 351 of the fourth driving electrodes 350, and lower portions of the eighth driving electrodes 450.

Then, gold (Au) is plated on the first electrode layer 11, so that a plating layer is formed.

Figure 10:
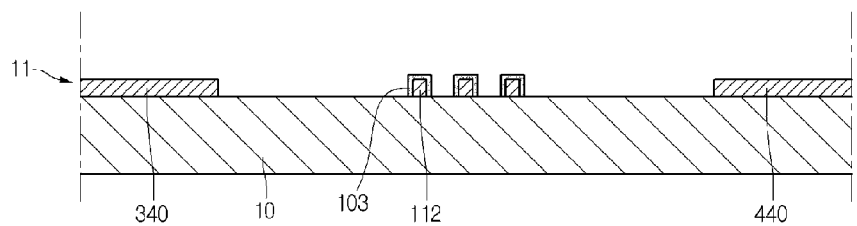

Referring to FIG. 10, the dielectric layer 103 is formed on the first electrode 100. The dielectric layer 103 can be formed through the vacuum deposition process or the coating process. In addition, the dielectric layer 103 is patterned through the patterning process.

Figure 11:
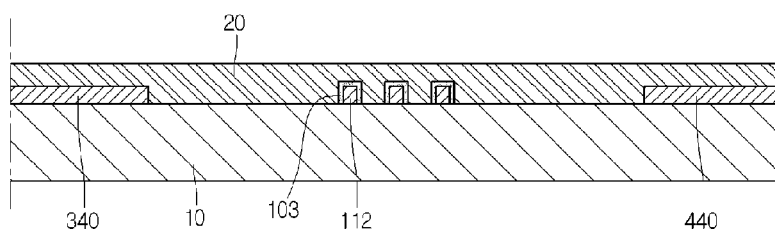
Figure 12:
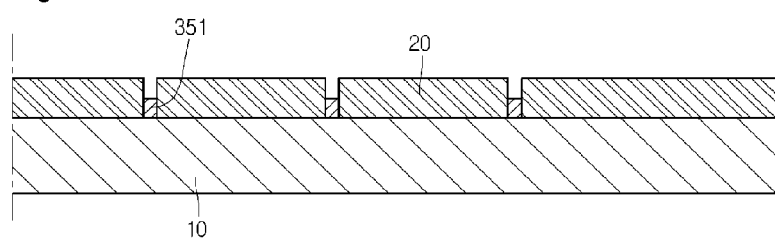
Figure 13:
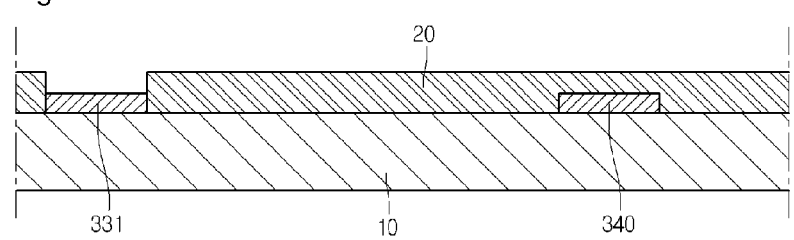

Referring to FIGS. 11 to 13, a sacrificial spacer layer 20 is formed on the first electrode layer 11. The sacrificial spacer layer 20 covers the third driving electrode 340 and the seventh driving electrode. The sacrificial spacer layer 20 can expose the lower portion 331 of the first fixing part 330, the lower portion of the second fixing part 450, the lower portions 351 of the fourth driving electrodes 350, and the lower portions of the eighth driving electrodes 450.

The sacrificial spacer layer 20 may have the thickness in the range of about 3 μm to about 7 μm. The sacrificial spacer layer 20 can be formed by using a metal, such as Cu, polymer or inorganic substance, such as nitride or oxide.

Figure 14:
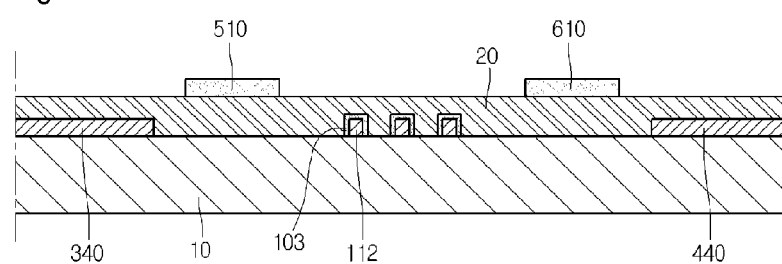

Referring to FIG. 14, the first insulating part 510 and the third insulating part 610 are formed on the sacrificial spacer layer 20. The first insulating part 510 is formed in the region between the first electrode 100 and the third driving electrode 340. In addition, the third insulating part 610 is formed in the region between the first electrode 100 and the seventh driving electrode 440.

The first insulating part 510 and the third insulating part 610 may have the thickness in the range of about 3 μm to about 6 μm.

Figure 15:
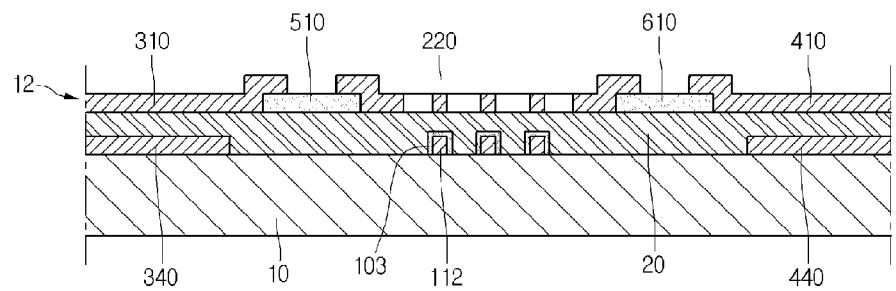
Figure 16:
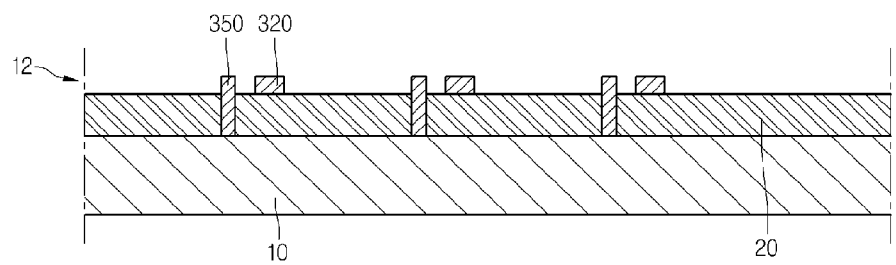
Figure 17:
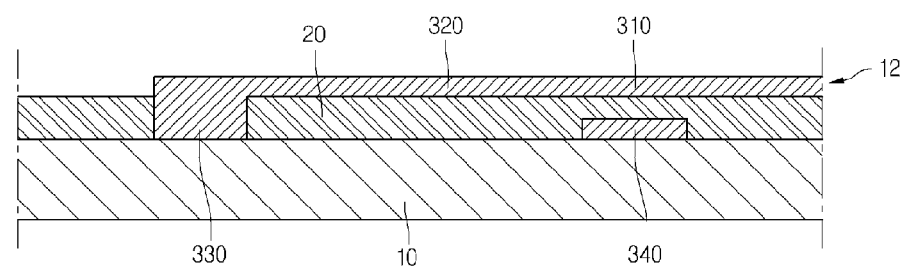

Referring to FIGS. 15 to 17, a second electrode layer 12 is formed on the sacrificial spacer layer 20. The second electrode layer 12 covers the first insulating part 510 and the third insulating part 610. The second electrode layer 12 can be formed by depositing a metal or an alloy having high electric conductivity. For instance, the second electrode layer 12 can be formed through the plating process.

The second electrode layer 12 includes the second electrode 200, the first driving electrode 3'0, the second driving electrodes 320, the fifth driving electrode, sixth driving electrodes, an upper portion of the first fixing part 330, an upper portion of the second fixing part 430, upper portions of the fourth driving electrodes 350, and upper portions of the eighth driving electrodes 450.

Figure 18:
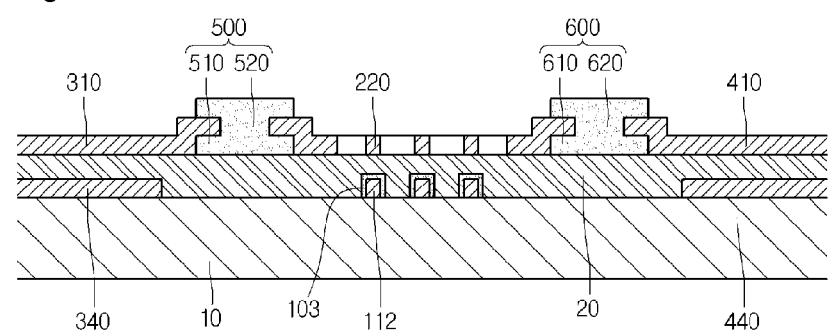

Referring to FIG. 18, the second insulating part 520 is formed between the first driving electrode 310 and the second electrode 200. The second insulating part 520 may be formed on a part of the top surface of the first driving electrode 310 and on a part of the top surface of the second electrode 200. In addition, the fourth insulating part 620 is formed between the fifth driving electrode 410 and the second electrode 200. The fourth insulating part 620 may be formed on a part of the top surface of the fifth driving electrode 510 and on a part of the top surface of the second electrode 200.

Figure 19:
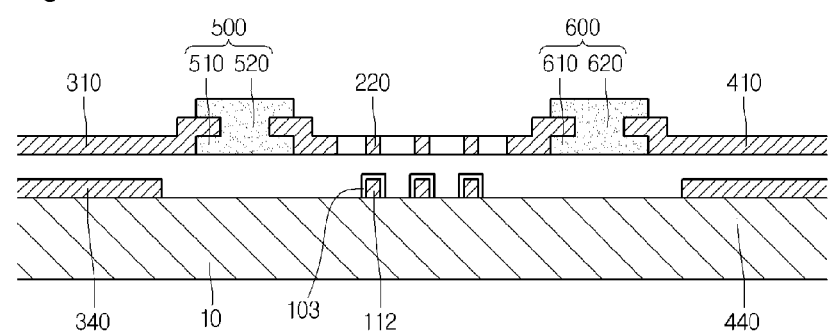
Figure 20:
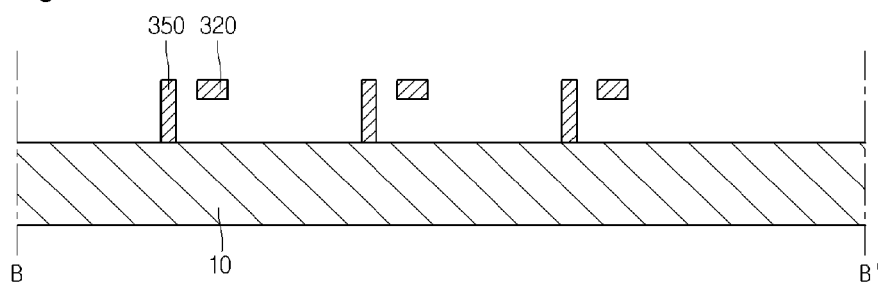
Figure 21:
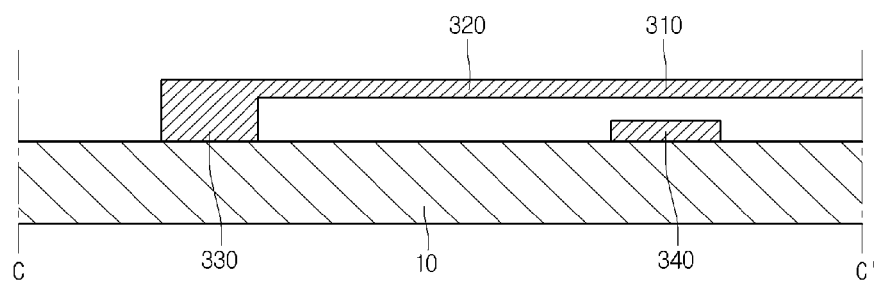

Referring to FIGS. 19 to 21, the sacrificial spacer layer 20 is removed. Then, gold (Au) is plated on the electrode layer to form the plating layer.

As described above, according to the method for fabricating the variable capacitor of the embodiment, the variable capacitor capable of continuously varying the capacitance through the mechanical driving scheme can be provided.

Figure 22:
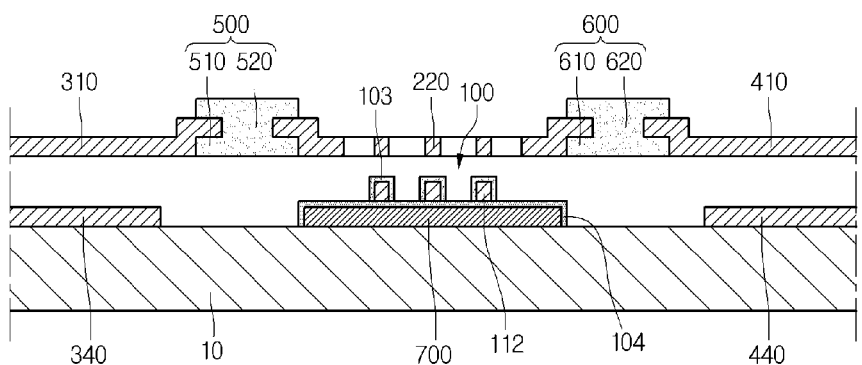
FIG. 22 is a sectional view showing a variable capacitor according to the second embodiment.

FIG. 22 is a sectional view showing a variable capacitor according to the second embodiment. In the description about the present embodiment, the previous description about the variable capacitor and the fabrication method thereof will be incorporated by reference. That is, the previous description of the variable capacitor and the fabrication method thereof may be basically incorporated herein by reference except for the modified parts.

Referring to FIG. 22, the variable capacitor according to the second embodiment includes a third driving member. The third driving member includes a ninth driving electrode 700. In detail, the third driving member consists of the ninth driving electrode 700.

The ninth driving electrode 700 corresponds to the second electrode 200. In detail, the ninth driving electrode 700 corresponds to the second electrode 200. The ninth driving electrode 700 is disposed on the substrate 10. In detail, the ninth driving electrode 700 is disposed between the substrate 10 and the first electrode 100.

In addition, an insulating layer 104 is interposed between the ninth driving electrode 700 and the first electrode 100. That is, the ninth driving electrode 700 is disposed on the substrate 10, the insulating layer 104 covers the ninth driving electrode 700, and the first electrode 100 is disposed on the insulating layer 104.

The ninth driving electrode 700 can move the second electrode 200 up and down. In detail, the ninth driving electrode 700 directly applies the electrostatic attractive force to the second electrode 200 to move the second electrode 200 in the downward direction.

Together with the first and second driving members 300 and 400, the ninth driving electrode 700 can move the second electrode 200 in the upward and downward directions.

Meanwhile, the ninth driving electrode 700 alone can move the second electrode 200 in the upward and downward directions. That is, the third driving electrode and the seventh driving electrode may be omitted from the first and second driving members 300 and 400. In this case, the first and second driving members 300 and 400 moves the second electrode 200 in the first direction only, and the ninth driving electrode 700 moves the second electrode 200 in the upward and downward directions.

In this manner, the ninth driving electrode 700 directly controls the second electrode 200. Thus, the variable capacitor according to the present embodiment can mechanically and precisely control the up-down movement of the second electrode 200. In particular, in the variable capacitor according to the present embodiment, the second electrode 200 can make contact with the entire surface of the dielectric layer 103.

Therefore, the variable capacitor according to the present embodiment can precisely generate the desired capacitance between the first and second electrodes 100 and 200.

Figure 23:
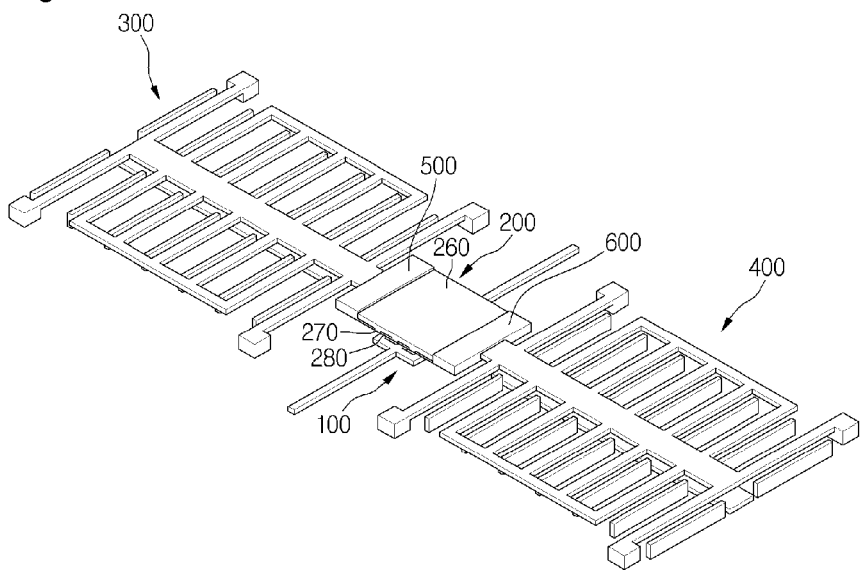
FIG. 23 is a perspective view showing a variable capacitor according to the third embodiment.
Figure 24:
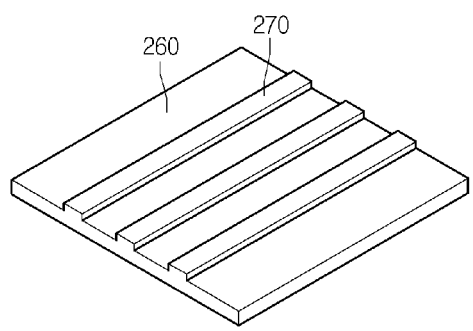
FIG. 24 is a perspective view showing a bottom surface of a second electrode according to the third embodiment.
Figure 25:
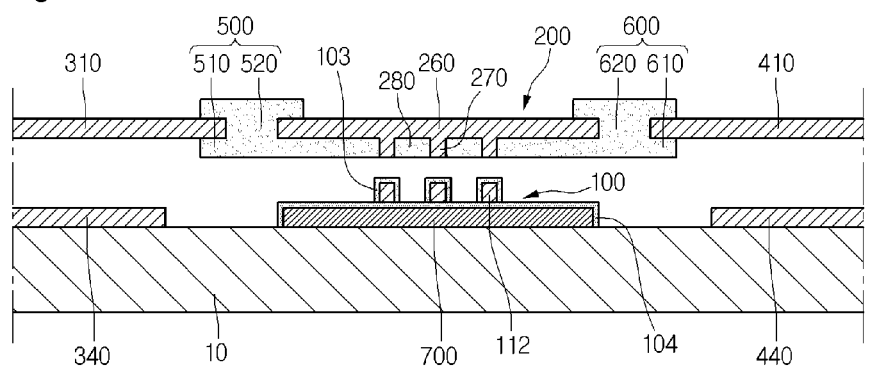
FIG. 25 is a sectional view showing a second electrode according to the third embodiment.

FIG. 23 is a perspective view showing a variable capacitor according to the third embodiment, FIG. 24 is a perspective view showing a bottom surface of a second electrode according to the third embodiment, and FIG. 25 is a sectional view showing the second electrode according to the third embodiment. In the description about the present embodiment, the previous description about the variable capacitor and the fabrication method thereof will be incorporated by reference. That is, the previous description of the variable capacitor and the fabrication method thereof may be basically incorporated herein by reference except for the modified parts.

Referring to FIGS. 23 to 25, the second electrode 200 includes a support electrode 260 and a plurality of protruding electrodes 270.

The support electrode 260 has a plate shape. The support electrode 260 corresponds to the first electrode 100. In detail, the support electrode 260 faces the first electrode 100. The support electrode 260 overlaps with the first electrode 100.

In addition, the support electrode 260 corresponds to the ninth driving electrode 700. In addition, the support electrode 260 overlaps with the ninth driving electrode 700. The support electrode 260 may have a shape substantially identical to a shape of the ninth driving electrode 700.

The protruding electrodes 270 protrude downward from the support electrode 260. The protruding electrodes 270 may extend in one direction. In detail, the protruding electrodes 270 may extend in the direction perpendicularly crossing the first direction.

The protruding electrodes 270 correspond to the first branch electrodes 112 of the first electrode 100, respectively. In addition, the protruding electrodes 270 correspond to the third branch electrodes 122 of the first electrode 100, respectively. In detail, one protruding electrode 270 may simultaneously correspond to one first branch electrode 112 and one third branch electrode 122. That is, the protruding electrodes 270 are disposed over the first branch electrodes 112 and the third branch electrodes 122.

In addition, the protruding electrodes 270 may have the width corresponding to the width of the first branch electrodes 112. Further, the width of the protruding electrodes 270 may correspond to the width of the third branch electrodes 122.

The second electrode 200 includes a plurality of gap insulating parts 280. The gap insulating parts 280 are disposed among the protruding electrodes 270. That is, the gap insulating parts 280 are filled among the protruding electrodes 270.

The bottom surfaces of the gap insulating parts 280 may be aligned on the same plane with the bottom surfaces of the protruding electrodes 270. The gap insulating parts 280 can be formed by using a material the same as that of the first and second insulating connection members 500 and 600.

Since the variable capacitor according to the present embodiment includes the support electrode 260, the mechanical strength of the second electrode 200 can be improved. In addition, the support electrode 260 may improve the electric characteristics of the second electrode 200.

In addition, since the support electrode 260 has the plate shape, the ninth driving electrode 700 can effectively apply the electrostatic attractive force to the second electrode 200. Thus, the ninth driving electrode 700 can effectively move the second electrode 200.

Further, the gap insulating parts 280 may insulate the lateral sides of the protruding electrodes 270 and the bottom surface of the support electrode 260. Thus, the variable capacitor according to the embodiment can minimize the error of the capacitance generated between the first and second electrodes 100 and 200.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:
1. A capacitor comprising:
a first electrode part;
a second electrode part spaced apart from the first electrode part and disposed on an upper surface of the first electrode part;

a driving member connected to the second electrode part to move the second electrode part relative to the first electrode part; and an insulating connection member between the driving member and the second electrode part;

wherein the driving member comprises first and second driving members spaced apart from each other; and wherein each of the first and second driving members comprises:

a first driving electrode part configured to move the second electrode part in a horizontal direction relative to the first electrode part and control an overlap area between the upper surface of the first electrode part and a lower surface of the second electrode part; and a second driving electrode part configured to move the second electrode part in a vertical direction crossing the horizontal direction relative to the first electrode part.

2. The capacitor of claim 1, wherein the second electrode part is connected to the first driving member or the second driving member through the insulating connection member.

3. The capacitor of claim 2, wherein the insulating connection member includes an oxide, a nitride, or a polymer.

4. The capacitor of claim 2, wherein the second electrode part is partially inserted into the insulating connection member.

5. The capacitor of claim 1, wherein the first electrode part comprises:
   a first electrode including a first connection electrode and a plurality of first branch electrodes extending from the first connection electrode; and
   a second electrode spaced apart from the first electrode and including a second connection electrode and a plurality of second branch electrodes extending from the second connection electrode.

6. The capacitor of claim 3, wherein the second electrode part comprises:
   a main electrode extending in a first direction;
   a plurality of first sub-electrodes extending from the main electrode and corresponding to the first branch electrodes, respectively; and
   a plurality of second sub-electrodes extending from the main electrode and corresponding to the second branch electrodes, respectively.

7. The capacitor of claim 6, wherein the second electrode part further comprises:
   a third connection electrode connected to the first sub-electrodes; and
   a fourth connection electrode connected to the second sub-electrodes.

8. The capacitor of claim 1, further comprising a substrate for fixing the first electrode part and the first driving member or the second driving member, wherein the second electrode part is moved relative to the substrate.

9. A capacitor comprising:
   a substrate;
   a first electrode part on the substrate;
   a second electrode part overlapping with the first electrode part on the substrate and disposed on an upper surface of the first electrode part; and
   a driving member fixed to the substrate to control a distance between the first and second electrode parts and an overlap area between the first and second electrode parts;
   wherein the first electrode part comprises:
   a first electrode facing a part of the second electrode part; and a third electrode spaced apart from the first electrode while facing another part of the second electrode part;
   wherein the driving member comprises first and second driving members spaced apart from each other; and
   wherein each of the first and second driving members comprises:
   a first driving electrode part configured to move the second electrode part in a horizontal direction relative to the first electrode part and control an overlap area between the upper surface of the first electrode part and a lower surface of the second electrode part; and
   a second driving electrode part configured to move the second electrode part in a vertical direction crossing the horizontal direction relative to the first electrode part.

10. The capacitor of claim 9, further comprising a dielectric layer between the first and second electrode parts.

11. The capacitor of claim 9, wherein the first driving electrode part comprises:
    a first driving electrode connected to the second electrode part; and
    a third driving electrode overlapping with the first driving electrode.

12. The capacitor of claim 11, further comprising an insulating connection member connected to the second electrode part, wherein the first driving electrode is connected to the insulating connection member.

13. The capacitor of claim 11, wherein the first driving electrode part further comprises: a fixing part fixed to the substrate and connected to the third driving electrode.

14. The capacitor of claim 9, further comprising an insulating connection member interposed between the first driving member or the second driving member and the second electrode part, wherein the second electrode part is physically connected to the first driving member or the second driving member through the insulating connection member, and the second electrode part and the first driving member or the second driving member are electrically insulated from each other.

15. The capacitor of claim 9, further comprising an input wire connected to the first electrode of the first electrode part and an output wire connected to the third electrode of the first electrode part.

16. The capacitor of claim 9, wherein the first electrode of the first electrode part comprises a first connection electrode and a plurality of first branch electrodes extending from the first connection electrode; and wherein the third electrode of the first electrode part comprises a second connection electrode and a plurality of second branch electrodes extending from the second connection electrode.

17. A capacitor comprising:
    a first electrode part;
    a second electrode part spaced apart from the first electrode part and disposed on an upper surface of the first electrode part;
    a driving member connected to the second electrode part to move the second electrode part relative to the first electrode part; and
    an insulating connection member between the driving member and the second electrode part;
    wherein the second electrode part comprises:
    a support electrode facing the first electrode part; and
    a protruding electrode protruding from the support electrode toward the first electrode part;
    wherein the driving member is connected to the support electrode through the insulating connection member,
    wherein the driving member comprises first and second driving members spaced apart from each other, and wherein each of the first and second driving members comprises:
a first driving electrode part configured to move the second electrode part in a horizontal direction relative to the first electrode part and control an overlap area between the upper surface of the first electrode part and a lower surface of the second electrode part; and
a second driving electrode part configured to move the second electrode part in a vertical direction crossing the horizontal direction relative to the first electrode part.

18. The capacitor of claim 17, wherein the support electrode and the protruding electrode are integrally formed with each other.

19. The capacitor of claim 17, wherein the protruding electrode extends in one direction, and
wherein the first electrode part includes a branch electrode corresponding to the protruding electrode.

* * * * *